Patented Nov. 4, 1952

2,616,853

UNITED STATES PATENT OFFICE 2,616,853

MINERAL OIL COMPOSITION CONTAINING ALCOHOL AND AMINE DERIVATIVES OF MALEIC ANHYDRIDE-ITACONIC ACID ESTER COPOLYMERS AS POUR POINT DEPRESSANTS AND VISCOSITY INDEX IMPROVERS

John J. Giammaria, Woodbury, N. J., assignor to Socony-Vacuum Oil Company, Incorporated, a corporation of New York No Drawing. Application May 11, 1949,
Serial No. 92,728

14 Claims. (Cl. 252—51.5)

This invention relates to new compositions of matter and to improved mineral oil compositions containing the same.

In a copending application, Serial Number 92,727, filed May 11, 1949, copolymers produced by copolymerizing maleic anhydride with esters of itaconic acid and metal salts of these copolymers have been disclosed and claimed. Mineral oil compositions of these copolymers and salts are also disclosed and claimed, such compositions having improved viscosity indices and lower pour points than the mineral oils alone.

In accordance with this invention, the copolymers described in the copending application are further reacted with alcohols or amines to produce a new class of reaction products. These new products are oil-soluble, substantially neutral in character and notably effective for improving the viscosity indices and lowering the pour points of mineral lubricating oils. Accordingly, it is the primary object of this invention to provide mineral lubricating oil compositions containing these new products, said compositions having substantially lower pour points and higher viscosity indices than exhibited by the lubricating oils alone. Other objects of the invention will also be apparent from the following detailed description thereof.

The copolymers contemplated herein are prepared by copolymerizing maleic anhydride with a di-ester of itaconic acid, represented by the general formula:

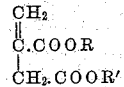

where R and R' are members of the group consisting of alkyl, aryl, alkaryl and cycloaliphatic groups. Preferably, R is a straight chain alkyl group derived from a primary, normal, aliphatic alcohol of from 1 to 18 carbon atoms. Esters of primary, normal, aliphatic alcohols of from 12 to 16 carbon atoms are particularly preferred. Also preferred are esters derived from mixtures of primary, normal, aliphatic alcohols having an average of about 14 carbon atoms per molecule. Such mixtures are marketed under the trade names "Lorol-B" and "Lorol-5", by the E. I. du Pont de Nemours Co. These alcohol mixtures contain primary, normal, aliphatic alcohols having from 10 to 18 carbon atoms per molecule in approximately the following proportions:

| | "Lorol-B" | "Lorol-5" |
|---|---|---|
| $C_{10}$ percent | 2.5 | 2.8 |
| $C_{12}$ do | 55.0 | 61.0 |
| $C_{14}$ do | 20.5 | 21.0 |
| $C_{16}$ do | 9.0 | 11.0 |
| $C_{18}$ do | 13.0 | 2.2 |
| Ave. No. of C Atoms | 13.5 | 12.7 |

The ester reactant may be prepared by esterification of the itaconic acid with the desired alcohol by methods well known to the art. For example, the acid and alcohol may be heated together in the presence of a catalyst such as sulfuric acid; a solvent, such as benzene, xylene or dioxane being employed if desired.

As non-limiting examples of suitable itaconic acid ester reactants there may be mentioned: dimethyl itaconate, dipropyl itaconate, dihexyl itaconate, diethylhexyl itaconate, dioctyl itaconate, didecyl itaconate, didodecyl itaconate, ditetradecyl itaconate, di"Lorol-B" itaconate, di"Lorol-5" itaconate, dihexadecyl itaconate, dioctadecyl itaconate, diethenyl itaconate, dibutenyl itaconate, diheptenyl itaconate, diundecenyl itaconate, ditridecenyl itaconate, diheptadecenyl itaconate, dicyclohexyl itaconate, diphenyl itaconate, dinaphthyl itaconate, di(butylphenyl) itaconate and di(octylnaphthyl) itaconate.

As disclosed in the copending application, the copolymerization of the maleic anhydride with the itaconic acid ester to produce the copolymers herein utilized may be carried out under well known polymerizing conditions, i. e. by heating the reaction mixture at temperatures of from about 75° C. to about 150° C. in the presence of a small amount, i. e. from about 0.1 per cent by weight to about 5.0 per cent by weight, of an organic peroxide catalyst, such as benzoyl peroxide. The reaction may be run in bulk or in the presence of a suitable solvent, such as benzene, xylene or dioxane; the solvent being removed after the reaction is completed.

The time required to complete the reaction varies from 1 to several hours depending on the amount of catalyst used and the mode of polymerization, i. e. whether the reaction is carried out in bulk or in solution. Ordinarily, bulk polymerization is preferred, the required reaction time being from about 1 to about 2 hours. The proportions of reactants may be varied from about 1 mole of maleic anhydride to 4 moles of itaconic acid ester, and vice versa, although 0.5 to 1 mole of the anhydride per mole of ester is generally preferred.

Typical of the copolymers contemplated for reaction with the alcohols and amines of this invention are: maleic anhydride-dimethyl itaconate copolymer, maleic anhydride-dipropyl itaconate copolymer, maleic anhydride-diamyl itaconate copolymer, maleic anhydride-diheptyl itaconate copolymer, maleic anhydride-dinonyl itaconate copolymer, maleic anhydride-ditetradecyl itaconate copolymer, maleic anhydride-di-"Lorol-5" itaconate copolymer, maleic anhydride di"Lorol-B" itaconate copolymer, maleic anhydride-dihexadecyl itaconate copolymer, maleic anhydride-dioctadecyl itaconate copolymer, maleic anhydride-diethenyl itaconate copolymer, maleic anhydride-dihexenyl itaconate copolymer, maleic anhydride-didecenyl itaconate copolymer, maleic anhydride-ditetradecenyl itaconate copolymer, maleic anhydride-dioctadecenyl itaconate copolymer, maleic anhydride-isooctyl itaconate copolymer, maleic anhydride-dicyclohexyl itaconate copolymer, maleic anhydride-diphenyl itaconate copolymer, maleic anhydride-dinaphthyl itaconate copolymer and maleic anhydride di(octylphenyl) itaconate copolymer.

As aforesaid, the products contemplated by the present invention are produced by reaction of the acidic copolymers of the copending application with alcohols and amines. Any alcohol or amine may be utilized to produce the desired class of products. Thus, the alcohol may be aliphatic or aromatic in character and either saturated or unsaturated. The aliphatic alcohols may be branch chained, straight chained or cyclic in structure. In general, it is preferred to use primary, normal, aliphatic alcohols containing from 1 to 18 carbon atoms, those having from 12 to 16 carbon atoms being particularly preferred. Mixtures of alcohols, such as "Lorol-B" and "Lorol-5", described hereinbefore, having an average of about 14 carbon atoms per molecule are especially preferred. Of the amines, it is preferred to use aliphatic, primary amines containing 8 to 18 carbon atoms, or the corresponding secondary amines. Thus, with a primary amine, the imide or amide of the anhydride may be formed, depending upon the proportions used. With a secondary amine, a monoamide or diamide may be formed, depending also upon the proportions used.

The conditions for reaction of the copolymer with the alcohol or amine are similar to those generally utilized in esterification reactions. Thus, the reactants may be heated in the presence of a catalyst, such as sulfuric acid. A solvent, such as xylene, may be used, if desired.

Typical of the copolymer alcohol (or amine) products contemplated herein are the following: the product of maleic anhydride-diethyl itaconate copolymer with octadecyl alcohol, the product of maleic anhydride-diethyl itaconate copolymer with methyl amine, the product of maleic anhydride-dibutyl itaconate copolymer with hexadecyl alcohol, the product of maleic anhydride-dibutyl itaconate copolymer with butyl amine, the product of maleic anhydride-dihexyl itaconate copolymer with pentadecyl alcohol, the product of maleic anhydride-dihexyl itaconate copolymer with hexyl amine, the product of maleic anhydride-dioctyl itaconate copolymer with tetradecyl alcohol, the product of maleic anhydride-dioctyl itaconate copolymer with tetradecenyl alcohol, the product of maleic anhydride-dioctyl itaconate copolymer with octyl amine, the product of maleic anhydride-didecyl itaconate copolymer with "Lorol-B" alcohol, the product of maleic anhydride-didecyl itaconate copolymer with decyl amine, the product of maleic anhydride-didecenyl itaconate copolymer with "Lorol-B" alcohol, the product of maleic anhydride-didodecyl itaconate copolymer with dodecyl alcohol, the product of maleic anhydride-didodecyl itaconate copolymer with dodecyl amine, the product of maleic anhydride-didodecyl itaconate copolymer with dodecenyl amine, the product of maleic anhydride-di"Lorol-B" itaconate copolymer with "Lorol-B" alcohol, the product of maleic anhydride-di"Lorol-B" itaconate copolymer with tetradecenol, the product of maleic anhydride-ditetradecyl itaconate copolymer with "Lorol-B" alcohol, the product of maleic anhydride-dioctadecyl itaconate copolymer with tetradecyl amine, the product of maleic anhydride-ditetradecyl itaconate copolymer with decyl alcohol, the product of maleic anhydride-ditetradecyl itaconate copolymer with tetradecyl amine, the product of maleic anhydride-dihexadecyl itaconate copolymer with hexyl alcohol, the product of maleic anhydride-dihexadecyl itaconate copolymer with pentadecyl amine, the product of maleic anhydride-dioctadecyl itaconate copolymer with pentyl alcohol, the product of maleic anhydride-dioctadecyl itaconate copolymer with hexadecyl amine, the product of maleic anhydride-dioctadecenyl itaconate copolymer with octadecenyl amine, the product of maleic anhydride-diphenyl itaconate copolymer with tetradecyl amine, the product of maleic anhydride-dinaphthyl itaconate copolymer with "Lorol-B" alcohol, the product of maleic anhydride-dicyclohexyl itaconate copolymer with "Lorol-B" alcohol, the product of maleic anhydride-di"Lorol-B" itaconate copolymer with aniline.

The products contemplated herein vary somewhat in pour point depressant and viscosity index-improving effects in accordance with the particular alcohol used in preparing the ester reactant and with the particular alcohol or amine utilized in preparing the final copolymer derivative. Thus, I have found that superior pour point depressants and viscosity index improvers are obtained when the itaconic ester reactant is derived from a primary, normal, aliphatic alcohol having between 12 and 16 carbon atoms or from a mixture of primary, normal, aliphatic alcohols having an average of about 14 carbon atoms per molecule. Also, the more effective copolymer derivatives are obtained by the use of primary, normal, aliphatic alcohols of from 12 to 16 carbon atoms and mixtures of primary, normal, aliphatic alcohols having an average of about 14 carbon atoms. Primary, normal, aliphatic amines having between 12 and 16 carbon atoms likewise give superior derivatives. The products contemplated herein which are prepared by the use of primary, normal, aliphatic alcohols of from 12 to 16 carbon atoms or from mixtures of primary, normal, aliphatic alcohols having an average of about 14 carbon atoms per molecule, in both the preparation of the ester reactant and in the final esterification reaction are most effective as pour point depressants and viscosity index improvers for mineral oils and are therefore especially preferred herein.

The following specific examples and results of tests will serve to illustrate the method of preparation and utility of the product materials of this invention.

EXAMPLE I

*Product of maleic anhydride-dimethyl itaconate copolymer and n-octadecanol*

Twenty-four and one-half grams of maleic anhydride, 39.5 grams of dimethyl itaconate and 1.92 grams of benzoyl peroxide were mixed and slowly heated over a period of ½ hour, while stirring, to 115° C. Heating was discontinued but the reaction was sufficiently exothermic to maintain this temperature for about fifteen minutes. At the end of this time, heat was again applied and the reaction mixture was heated ½ hour longer at 115° C. The mixture was cooled and dissolved in acetone. The copolymer failed to precipitate when this solution was poured into benzene. The solution was then washed with hot water, filtered and the solvents removed by distillation. The copolymer was a dark brown resin.

Ten grams of this copolymer, 25.0 grams of n-octadecanol, 0.70 gram of concentrated $H_2SO_4$ and 200 cc. of xylene were mixed and heated at xylene reflux, the water of reaction being separated by means of a Dean and Stark moisture trap. Xylene was gradually distilled from the reaction zone whereby the temperature was finally raised to 180° C. The residue (Product I) was cooled, dissolved in benzene and the solution was washed with hot water. The solution was finally filtered and the solvent removed by distillation. Unreacted alcohol was removed by heating to 300° C. at 1 mm. pressure of Hg.

EXAMPLE II

*Product of maleic anhydride-di"Lorol-B" itaconate copolymer and "Lorol-B" alcohol mixture*

Four and nine-tenths grams of maleic anhydride, 27.0 grams of di"Lorol-B" itaconate and 0.96 gram of benzoyl peroxide were mixed and slowly heated, while stirring, to 100° C. This temperature was held for 24 hours after which the viscous copolymer was cooled and dissolved in benzene. The solution was washed with hot water, filtered and the solvent removed by distillation.

Ten grams of this copolymer, 15.0 grams of "Lorol-B" alcohol, 0.50 gram of p-toluene sulfonic acid and 200 cc. of xylene were mixed and treated as in Example I to form the "Lorol-B" ester of the copolymer (Product II).

EXAMPLE III

*Product of maleic anhydride-di"Lorol-B" itaconate copolymer and n-octanol*

Ten grams of a maleic anhydride—"Lorol-B" itaconate copolymer similar to that prepared in Example II, 8.5 grams of n-octanol, 0.37 gram of p-toluene sulfonic acid and 200 cc. of xylene were mixed and treated as in Example I to form the octyl ester of the copolymer (Product III).

EXAMPLE IV

*Product of maleic anhydride-di"Lorol-B" itaconate copolymer and n-tetradecanol*

Ten grams of copolymer, similar to that prepared in Example II, 10 grams of n-tetradecanol, 0.2 gram of concentrated $H_2SO_4$ and 200 cc. of xylene were mixed and treated as described in Example I to form the tetradecyl ester of the copolymer (Product IV). In this case, the crude ester was heated to 275° C. at 1 mm. of mercury pressure to distill unreacted alcohol.

EXAMPLE V

*Product of maleic anhydride-di"Lorol-B" itaconate copolymer and n-octadecanol*

Ten grams of copolymer, similar to that prepared in Example II, 12.0 grams of n-octadecanol, 0.2 gram of concentrated $H_2SO_4$ and 200 cc. of xylene were mixed and treated as described in Example I to form the octadecyl ester of the copolymer (Product V). Unreacted alcohol was removed by heating the crude ester to 300° C. at 1 mm. of mercury pressure.

EXAMPLE VI

*Product of maleic anhydride-ditretradecyl itaconate copolymer and "Lorol-B" alcohol mixture*

Nine and eight-tenths grams of maleic anhydride, 52.5 grams of ditetradecyl itaconate and 1.87 grams of benzoyl peroxide were mixed and heated at 100° C. for seven hours. The viscous copolymer was purified as described in Example II.

Ten grams of this copolymer, 8.3 grams of "Lorol-B" alcohol, 0.37 gram of p-toluene-sulfonic acid and 200 cc. of xylene were mixed and treated as in Example I to form the "Lorol-B" ester of the copolymer (Product VI).

EXAMPLE VII

*Product of maleic anhydride-dioctadecyl itaconate copolymer and "Lorol-B" alcohol mixture*

Five and nine-tenths grams of maleic anhydride, 38.0 grams of dioctadecyl itaconate and 1.32 grams of benzoyl peroxide were mixed and heated at 110° C. for four hours. The resulting copolymer was purified as described in Example II.

Five grams of this copolymer, 5.0 grams of "Lorol-B" alcohol, 0.20 gram of concentrated $H_2SO_4$ and 200 cc. of xylene were mixed and treated as described in Example I to form the ester of the copolymer (Product VII).

EXAMPLE VIII

*Product of Example II without purification of intermediate products*

The preparation of the "Lorol-B" ester of a maleic anhydride-di"Lorol-B" itaconate copolymer as described in Example II involves three separate preparations and purifications. This example illustrates the preparation of this product in continuous stages without purification of any of the intermediate compounds.

Thirty-two grams of itaconic acid, 105.0 grams of "Lorol-B" alcohol, 1.3 grams of p-toluene sulfonic acid and 100 cc. of xylene were mixed and heated at xylene reflux until the theoretical amount of water, for formation of the diester, was collected in a Dean and Stark moisture trap attached to the flask. All but 15 cc. of the xylene was then distilled from the reaction zone whereby the temperature was finally raised to 185° C. An atmosphere of $N_2$ was maintained in the reaction during the esterification. The ester was cooled to room temperature and 24.0 grams of maleic anhydride and 4.5 grams of benzoyl peroxide were added. The mixture was slowly heated to 100° C. at which point a vigorous, exothermic reaction took place resulting in a rapid temperature rise to 145° C. even though external heating was discontinued. As the reaction subsided, heat was again applied and a temperature of 150° C. was held for ½ hour. The viscous copolymer was cooled and 103.0 grams of "Lorol-B" alcohol, 1.0 cc. of concentrated $H_2SO_4$ and 75 cc. of xylene were added. The esterification of the copolymer was carried out as previously described. Two hundred and fifty-two grams of a viscous oil were obtained which was found to be substantially neutral and equal to the product from Example II in its effectiveness as a pour point depressant (Product VIII).

EXAMPLE IX

*Product of maleic anhydride-di"Lorol-B" itaconate copolymer and tetradecyl amine*

Fifteen grams of a maleic anhydride-di-"Lorol-B" itaconate copolymer, similar to that prepared in Example II, 5.2 grams of Armeen 14D, a relatively pure n-tetradecyl amine, and 150 cc. of xylene were mixed and heated at xylene reflux until no more water distilled into a Dean and Stark moisture trap attached to the flask. Xylene was then gradually distilled from the reaction zone whereby the temperature was finally raised to 175° C. The residue (Product IX) was transferred to a distilling flask and the remaining solvent distilled under vacuum.

When high molecular weight alcohols or amines are reacted with the maleic anhydride-itaconic ester copolymer, the removal of unreacted alcohol or amine by vacuum distillation is tedious and often incomplete. More rapid and complete removal of such alcohols or amines may be accomplished by extracting the crude product with two to four volumes of hot ethyl alcohol in which the alcohols and amines are soluble and in which the copolymers are insoluble.

The effectiveness of the products described herein as pour point depressants is illustrated by the data shown in Table I. The results were obtained in a Duo-sol refined, Mid-continent type base oil having a kinematic viscosity of 12.2 centistokes at 210° F. and an ASTM pour point of +20° F.

TABLE I

| Compound Blended in Oil | Conc., Weight Percent | A. S. T. M. Pour Point, °F. |
|---|---|---|
| Product II | 0.125 | −20 |
| Do | .062 | −5 |
| Product III | .125 | −10 |
| Do | .062 | +10 |
| Product IV | .125 | −15 |
| Do | .062 | −10 |
| Product V | .125 | −15 |
| Do | .062 | −10 |
| Product VI | .125 | −20 |
| Do | .062 | −15 |
| Product VIII | .125 | −20 |
| Do | .062 | −10 |
| Product IX | .125 | −20 |
| Do | .062 | −15 |

The effectiveness of certain of the products as viscosity index improvers is illustrated by the data in Table II. The results shown in Table II are typical of the whole group of products contemplated herein, any of the other products exhibiting similar potentiality in the oil. The results were obtained in an acid-refined, Mid-continent type oil stock having an initial viscosity index of 79.7.

TABLE II

| Compound Blended in Oil | Conc., Weight Percent | Kin. Vis.— @ 100° F. | Kin. Vis.— @ 210° F. | Viscosity Index |
|---|---|---|---|---|
| None | | 30.07 | 4.79 | 79.7 |
| Example I | 2.0 | 31.08 | 4.94 | 86.2 |
| Example VI | 2.0 | 32.26 | 5.12 | 92.9 |
| Example VII | 2.0 | 31.19 | 4.98 | 89.0 |

The proportion of additive to be incorporated in a lubricating oil will vary somewhat with the particular oil and with the improvement desired. Thus, concentrations of from about .05 per cent to about 10 per cent by weight of the pure compound may be used, although amounts as low as 0.01 per cent often provide significant improvement. With respect to the upper limit, of course, it will be uneconomical to add more than is necessary to impart to the lubricating oil the desired properties. Generally, not over 50% is usually used.

The products of this invention may be blended in lubricating oils containing other additives such as other types of pour point depressants and viscosity index improvers, detergents, antioxidants, anti-rust agents, anti-foam agents, etc.

It is to be understood that this invention is not limited in any way by the specific examples or illustrative procedures described herein but only as indicated in the following claims.

What is claimed is:

1. A mineral lubricating oil containing from about 0.01 per cent to about 50 per cent of a product produced by (1) copolymerizing maleic anhydride with a diester of itaconic acid, said diester having been obtained by esterifying itaconic acid with a primary, normal, monohydric, saturated, aliphatic alcohol, to form a copolymer and then (2) reacting said copolymer with a compound selected from the group consisting of a primary, normal, monohydric, saturated, aliphatic alcohol and an amine selected from primary and secondary amines.

2. A mineral lubricating oil containing from about 0.01 per cent to about 50 per cent of a product produced by (1) copolymerizing maleic anhydride with a diester of itaconic acid, said diester having been obtained by esterifying itaconic acid with a primary, normal, monohydric, saturated, aliphatic alcohol, containing from 1 to 18 carbon atoms, to form a copolymer and then (2) reacting said copolymer with a primary, normal, monohydric, saturated, aliphatic alcohol, containing from 1 to 18 carbon atoms.

3. A mineral lubricating oil containing from about 0.01 per cent to about 50 per cent of a product produced by (1) copolymerizing maleic anhydride with a diester of itaconic acid, said diester having been obtained by esterifying itaconic acid with a primary, normal, monohydric, saturated, aliphatic alcohol, containing from 1 to 18 carbon atoms, to form a copolymer and then (2) reacting said copolymer with a primary, normal, aliphatic amine, containing from 1 to 18 carbon atoms.

4. A mineral lubricating oil containing from about 0.01 per cent to about 50 per cent of a product produced by (1) copolymerizing maleic anhydride with a diester of itaconic acid, said diester having been obtained by esterifying itaconic acid with a primary, normal, monohydric, saturated, aliphatic alcohol, containing from 12 to 16 carbon atoms, to form a copolymer and then (2) reacting said copolymer with a primary, normal, monohydric, saturated, aliphatic alcohol, containing from 12 to 16 carbon atoms.

5. A mineral lubricating oil containing from about 0.01 per cent to about 50 per cent of a product produced by (1) copolymerizing maleic anhydride with a diester of itaconic acid, said diester having been obtained by esterifying itaconic acid with a primary, normal, monohydric, saturated, aliphatic alcohol, containing from 12 to 16 carbon atoms and then (2) reacting said copolymer with a primary, normal, monohydric, saturated, aliphatic amine, containing from 8 to 18 carbon atoms.

6. A mineral lubricating oil containing from about 0.01 per cent to about 50 per cent of a product produced by (1) copolymerizing maleic anhydride with a diester of itaconic acid, said diester having been obtained by esterifying itaconic acid with a mixture of primary, normal, monohydric, saturated, aliphatic alcohols, containing an average of about 14 carbon atoms per molecule, to form a copolymer and then (2) reacting said copolymer with a mixture of primary, normal, monohydric, saturated, aliphatic alcohols having an average of about 14 carbon atoms per molecule.

7. A mineral lubricating oil containing from about 0.01 per cent to about 50 per cent of a product produced by (1) copolymerizing maleic anhydride with ditetradecyl itaconate, to form a copolymer and then (2) reacting said copolymer with a mixture of primary, normal, monohydric, saturated, aliphatic alcohols having an average of about 14 carbon atoms per molecule.

8. A mineral lubricating oil containing from about 0.01 per cent to about 50 per cent of a product produced by (1) copolymerizing maleic anhydride with a diester of itaconic acid, said diester having been obtained by esterifying itaconic acid with a mixture of primary, normal, monohydric, saturated, aliphatic alcohols having an average of about 14 carbon atoms per molecule, to form a copolymer and then (2) reacting said copolymer with tetradecyl amine.

9. As a new composition of matter, the product produced by (1) copolymerizing, in the absence of ethylmethacrylate, maleic anhydride with a diester of itaconic acid, said diester having been obtained by esterifying itaconic acid with a primary, normal, monohydric, saturated, aliphatic alcohol, to form a copolymer and then (2) reacting said copolymer with a compound selected from the group consisting of a primary, normal, monohydric, saturated, aliphatic alcohol and an amine, selected from primary and secondary amines.

10. As a new composition of matter, the product produced by (1) copolymerizing, in the absence of ethylmethacrylate, maleic anhydride with a diester of itaconic acid, said diester having been obtained by esterifying itaconic acid with a primary, normal, monohydric, saturated, aliphatic alcohol, containing from 1 to 18 carbon atoms, to form a copolymer and then (2) reacting said copolymer with a primary, normal, monohydric, saturated, aliphatic alcohol containing from 1 to 18 carbon atoms.

11. As a new composition of matter, the product produced by (1) copolymerizing maleic anhydride with a diester of itaconic acid, said diester having been obtained by esterifying itaconic acid with a primary, normal, monohydric, saturated, aliphatic alcohol, containing from 1 to 18 carbon atoms, to form a copolymer and then (2) reacting said copolymer with a primary, normal, monohydric, saturated, aliphatic amine, containing from 1 to 18 carbon atoms.

12. As a new composition of matter, the product produced by (1) copolymerizing, in the absence of ethylmethacrylate, maleic anhydride with a diester of itaconic acid, said diester having been obtained by esterifying itaconic acid with a mixture of primary, normal, monohydric, saturated, aliphatic alcohols, containing an average of about 14 carbon atoms per molecule, to form a copolymer and then (2) reacting said copolymer with a mixture of primary, normal, monohydric, saturated, aliphatic alcohols having an average of about 14 carbon atoms per molecule.

13. As a new composition of matter, the product produced by (1) copolymerizing, in the absence of ethylmethacrylate, maleic anhydride with ditetradecyl itaconate, to form a copolymer and then (2) reacting said copolymer with a mixture of primary, normal, monohydric, saturated, aliphatic alcohols having an average of about 14 carbon atoms per molecule.

14. As a new composition of matter, the product produced by (1) copolymerizing maleic anhydride with a diester of itaconic acid, said diester having been obtained by esterifying itaconic acid with a mixture of primary, normal, monohydric, saturated, aliphatic alcohols having an average of about 14 carbon atoms per molecule, to form a copolymer and then (2) reacting said copolymer with tetradecyl amine.

JOHN J. GIAMMARIA.

REFERENCES CITED

The following references are of record in the file of this patent:

UNITED STATES PATENTS

| Number | Name | Date |
|---|---|---|
| 2,279,883 | D'Alelio | Apr. 14, 1942 |
| 2,366,517 | Gleason | Jan. 2, 1945 |
| 2,380,304 | Gleason | July 10, 1945 |
| 2,384,595 | Blair | Sept. 11, 1945 |